(12) United States Patent
Wang et al.

(10) Patent No.: US 11,566,627 B2
(45) Date of Patent: Jan. 31, 2023

(54) FAN DRIVING CIRCUIT

(71) Applicant: XIAMEN LEEDARSON LIGHTING CO., LTD, Fujian (CN)

(72) Inventors: Jun Wang, Fujian (CN); Jiaqing Zhuang, Fujian (CN); Haipeng Xiao, Fujian (CN)

(73) Assignee: XIAMEN LEEDARSON LIGHTING CO., LTD, Fujian (CN)

( * ) Notice: Subject to any disclaimer, the term of this patent is extended or adjusted under 35 U.S.C. 154(b) by 129 days.

(21) Appl. No.: 17/120,101

(22) Filed: Dec. 11, 2020

(65) Prior Publication Data

US 2021/0317833 A1 Oct. 14, 2021

(30) Foreign Application Priority Data

Apr. 13, 2020 (CN) .......................... 202020538624.X

(51) Int. Cl.
*F04D 25/06* (2006.01)
*H01F 7/06* (2006.01)

(52) U.S. Cl.
CPC ............. *F04D 25/06* (2013.01); *H01F 7/064* (2013.01)

(58) Field of Classification Search
CPC .......... F04D 25/06; H01F 7/064; H02P 23/24; H02P 25/18

USPC .......................................................... 361/152
See application file for complete search history.

(56) References Cited

U.S. PATENT DOCUMENTS

| 4,289,995 | A | * | 9/1981 | Sorber | .................. | E05F 15/611 |
| | | | | | | 318/369 |
| 4,689,533 | A | * | 8/1987 | Yang | .......................... | H02P 1/40 |
| | | | | | | 318/281 |
| 5,041,825 | A | * | 8/1991 | Hart | ........................ | G08C 17/02 |
| | | | | | | 454/294 |
| 5,164,644 | A | * | 11/1992 | Hsieh | ...................... | H02P 25/04 |
| | | | | | | 318/16 |

* cited by examiner

*Primary Examiner* — Kevin J Comber

(57) ABSTRACT

A fan driving circuit includes a primary winding, an activating capacitor, a control circuit, a switch circuit and a secondary winding. The primary winding and the activating capacitor are electrically coupled to an external power source. The control circuit generates a control signal. The switch circuit is electrically coupled to the first winding. The switch circuit is also electrically coupled to the activating capacitor. The switch circuit has at least one control terminal electrically coupled to the control circuit for receiving the control signal. The secondary winding is electrically coupled to the switch circuit. The secondary winding is electrically coupled to the switch circuit. The secondary winding electromagnetically drives a fan according to a flowing direction of its driving current. The switch circuit conducts the secondary winding's driving current's flowing direction based on the control signal's voltage level.

18 Claims, 2 Drawing Sheets

FAN DRIVING CIRCUIT

FIELD

The present invention relates to a fan driving circuit, and more particularly, to a fan driving circuit capable of switching a fan's bidirectional rotation in a controlled manner.

BACKGROUND

A conventional intelligent fan always rotates unidirectionally in a fixed manner. However, there are requirements for bidirectional rotation in an interchangeable manner.

SUMMARY

The present disclosure aims at disclosing a fan driving circuit that includes a primary winding, an activating capacitor, a control circuit, a switch circuit and a secondary winding. The primary winding has a first terminal that is electrically coupled to an external power source's positive terminal. The activating capacitor has a first terminal electrically coupled to a second terminal of the primary winding. Also, the activating capacitor has a second terminal that is electrically coupled to a negative terminal of the external power source. The control circuit generates a control signal. The switch circuit has a first terminal that is electrically coupled to the first input terminal of the first winding. Besides, the switch circuit has a second input terminal that is electrically coupled to the second terminal of the activating capacitor. Moreover, the switch circuit has at least one control terminal that is electrically coupled to the control circuit for receiving the control signal. The secondary winding has a first terminal electrically coupled to a first output terminal of the switch circuit. In addition, the secondary winding has a second terminal electrically coupled to a second output terminal of the switch circuit. The secondary winding electromagnetically drives a fan according to a flowing direction of its driving current. And the switch circuit conducts the secondary winding's driving current's flowing direction based on the control signal's voltage level.

In one example, the switch circuit conducts the secondary winding's driving current to flow from the secondary winding's first terminal to the secondary winding's second terminal when the control signal's voltage level is a low voltage level.

In one example, the switch circuit conducts the secondary winding's driving current to flow from the secondary winding's second terminal to the secondary winding's first terminal when the control signal's voltage level is high.

In one example, the switch circuit conducts the secondary winding's driving current to flow from the secondary winding's first terminal to the secondary winding's second terminal when the control signal's voltage level is a high voltage level.

In one example, the switch circuit conducts the secondary winding's driving current to flow from the secondary winding's second terminal to the secondary winding's first terminal when the control signal's voltage level is a low voltage level.

In one example, the control circuit includes a controller, a transistor and a diode. The controller generates a preliminary signal. The transistor has a control terminal that is electrically coupled to the controller for receiving the preliminary signal. Also, the transistor has a ground terminal that is electrically coupled to ground. The diode has a positive terminal that is electrically coupled to the transistor's output terminal and the switch circuit's first control terminal. Besides, the diode has a negative terminal electrically coupled to a direct current (DC) power source and the switch circuit's second control terminal.

In one example, the fan driving circuit includes a first resistor that has a first terminal electrically coupled to the controller. The first resistor also has a second terminal that is electrically coupled to the transistor's control terminal.

In one example, the fan driving circuit includes a second resistor that has a first terminal that is electrically coupled to the transistor's control terminal. The second resistor additionally has a second terminal that is electrically coupled to the transistor's ground terminal.

In one example, the transistor is implemented using one of a pnp-type bipolar-junction transistor (BJT), a npn-type BJT, an N-type metal-oxide semiconductor FET (MOSFET), and a P-type MOSFET.

In one example, the fan driving circuit includes an auxiliary switch that has a first terminal electrically coupled to the external power source's positive terminal. In addition, the auxiliary switch has a second terminal that is electrically coupled to the primary winding's first terminal.

In one example, the fan driving circuit includes an auxiliary switch that has a first terminal electrically coupled to the external power source's negative terminal. And the auxiliary switch has a second terminal that is electrically coupled to the activating capacitor's second terminal.

In one example, the switch circuit includes a switching winding, a first switch and a second switch. The switching winding has a first terminal electrically coupled to the switch circuit's first control terminal. Moreover, the switching winding has a second terminal that is electrically coupled to the switch circuit's second control terminal. The first switch has a first terminal that is electrically coupled to the primary winding's first terminal. In addition, the first switch has a second terminal that is selectively and electrically coupled to one of the secondary winding's first terminal and second terminal. The second switch has a first terminal electrically that is coupled to the activating capacitor's second terminal. Besides, the second switch has a second terminal that is selectively and electrically coupled to one of the secondary winding's first terminal and second terminal.

In one example, when the control signal has a low voltage level, the first switch exclusively and electrically connects the primary winding's first terminal with the secondary winding's first terminal, the second switch exclusively and electrically connects the activating capacitor's second terminal with the secondary winding's second terminal, and the secondary winding's drive current in response flows from its first terminal to its second terminal.

In one example, when the control signal has a high voltage level, the switching winding electromagnetically exerts a force on both the first switch and the second switch, the first switch in response electrically connects the primary winding's first terminal with the secondary winding's second terminal, the second switch in response electrically connects the activating capacitor's second terminal with the secondary winding's first terminal, and the secondary winding's drive current in response flows from its second terminal to its first terminal.

In one example, when the control signal has a high voltage level, the first switch exclusively and electrically connects the primary winding's first terminal with the secondary winding's first terminal, the second switch exclusively and electrically connects the activating capacitor's second terminal with the secondary winding's second terminal, and the secondary winding's drive current in response flows from its first terminal to its second terminal.

In one example, when the control signal has a low voltage level, the switching winding electromagnetically exerts a force on both the first switch and the second switch, the first switch in response electrically connects the primary winding's first terminal with the secondary winding's second terminal, the second switch in response electrically connects the activating capacitor's second terminal with the secondary winding's first terminal, and the secondary winding's drive current in response flows from its second terminal to its first terminal.

In one example, the first switch renders its second terminal to be electrically coupled to the secondary winding's first terminal by default, and the second switch renders its second terminal to be electrically coupled to the secondary winding's second terminal by default.

In one example, the first switch switches its second terminal to be electrically coupled to the secondary winding's second terminal in response to an electromagnetic force from the switching winding, and the second switch switches its second terminal to be electrically coupled to the secondary winding's first terminal in response to the electromagnetic force from the switching winding.

In one example, the first switch renders its second terminal to be electrically coupled to the secondary winding's second terminal by default, and the second switch renders its second terminal to be electrically coupled to the secondary winding's first terminal by default.

In one example, the first switch switches its second terminal to be electrically coupled to the secondary winding's first terminal in response to an electromagnetic force from the switching winding, and the second switch switches its second terminal to be electrically coupled to the secondary winding's second terminal in response to the electromagnetic force from the switching winding.

DETAILED DESCRIPTION

As mentioned above, the present disclosure discloses a fan driving circuit capable of rotating a fan in a bidirectional manner.

Figure 1:
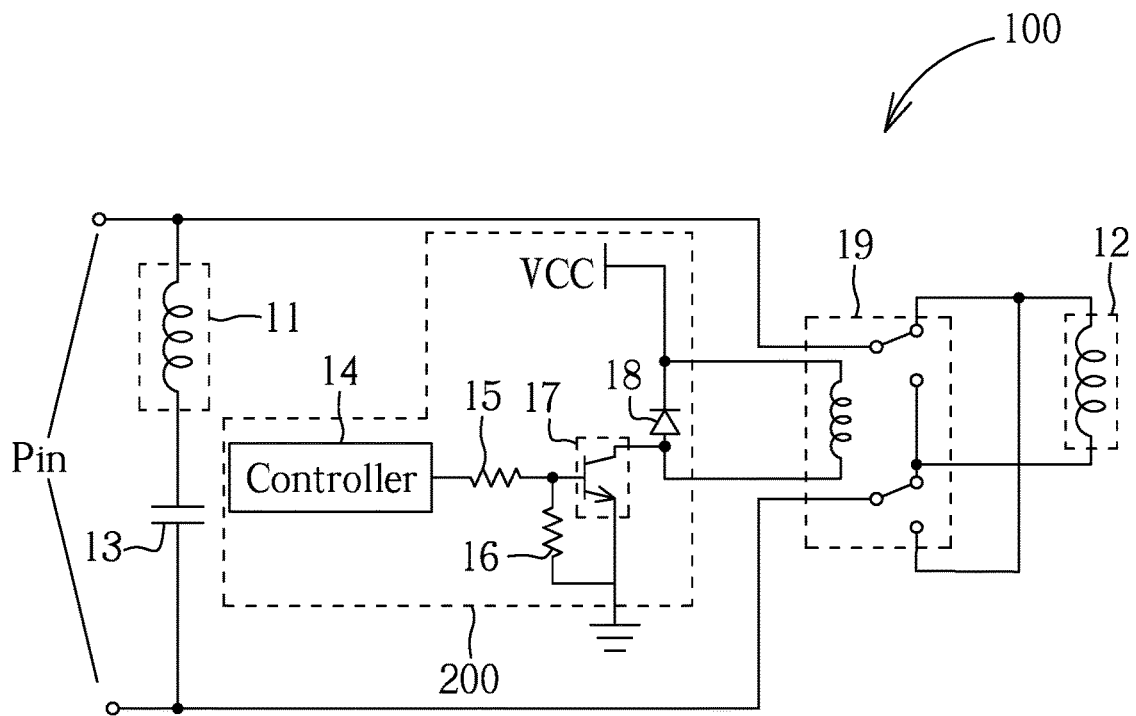
FIG. 1 illustrates a fan driving circuit according to one example of the present disclosure.

FIG. 1 illustrates a fan driving circuit 100 according to a first example of the present disclosure. The fan driving circuit 100 includes a primary winding 11, an activating capacitor 13, a control circuit 200, a switch circuit 19 and a secondary winding 12.

The primary winding 11 has a first terminal that is electrically coupled to an external power source's positive terminal. The activating capacitor 13 has a first terminal electrically coupled to a second terminal of the primary winding 11. Also, the activating capacitor has a second terminal that is electrically coupled to a negative terminal of the external power source. In this way, the primary winding 11's first terminal (at the node E1) and the activating capacitor 13's second terminal (at the node E2) form a pin for accepting the external power source.

The control circuit 200 generates a control signal.

The switch circuit 19 has a first terminal that is electrically coupled to the first input terminal of the first winding 11. Besides, the switch circuit 19 has a second input terminal that is electrically coupled to the second terminal of the activating capacitor 13. Moreover, the switch circuit 19 has at least one control terminal that is electrically coupled to the control circuit 200 for receiving the control signal.

The secondary winding 12 has a first terminal electrically coupled to a first output terminal of the switch circuit 19. In addition, the secondary winding has a second terminal electrically coupled to a second output terminal of the switch circuit 19. The secondary winding electromagnetically drives a fan according to a flowing direction of its driving current. And the switch circuit 19 conducts the secondary winding 12's driving current's flowing direction based on the control signal's voltage level.

In one example, the switch circuit 19 conducts the secondary winding 12's driving current to flow from the secondary winding 12's first terminal to the secondary winding 12's second terminal (downwards in FIG. 1's view) when the control signal's voltage level is a low voltage level. In some other examples, the switch circuit 19 may also perform the same downward current flow when the control signal's voltage level is a high voltage level.

In one example, the switch circuit 19 conducts the secondary winding 12's driving current to flow from the secondary winding 12's second terminal to the secondary winding 12's first terminal (upwards in FIG. 1's view) when the control signal's voltage level is high. In some other examples, the switch circuit 19 may also perform the same upward current flow when the control signal's voltage level is a low voltage level.

Specifically, in one example, the control circuit 200 includes a controller 14, a transistor 17 and a diode 18.

The controller 14 generates a preliminary signal.

The transistor 17 has a control terminal that is electrically coupled to the controller 14 for receiving the preliminary signal. Also, the transistor 17 has a ground terminal that is electrically coupled to ground.

The diode 18 has a positive terminal that is electrically coupled to the transistor 17's output terminal and the switch circuit 19's first control terminal. Besides, the diode 18 has a negative terminal electrically coupled to a direct current (DC) power source VCC and the switch circuit 19's second control terminal.

In one example, the fan driving circuit 100 includes a first resistor 15 that has a first terminal electrically coupled to the controller 14. The first resistor 15 also has a second terminal that is electrically coupled to the transistor 17's control terminal.

In one example, the fan driving circuit 100 includes a second resistor 16 that has a first terminal that is electrically coupled to the transistor 17's control terminal. The second resistor 16 additionally has a second terminal that is electrically coupled to the transistor's ground terminal.

In one example, the transistor 17 is implemented using one of a pnp-type bipolar-junction transistor (BJT), a npn-type BJT, an N-type metal-oxide semiconductor FET (MOSFET), and a P-type MOSFET. Therefore, when the transistor 17 is implemented using the pnp-type BJT, the transistor 17's control terminal is its base, the transistor 17's ground terminal is its collector, and the transistor 17's output terminal is its emitter. Similarly, when the transistor 17 is implemented using the npn-type BJT, the transistor 17's control terminal is its base, the transistor 17's ground terminal is its emitter, and the transistor 17's output terminal is its collector. Moreover, when the transistor 17 is implemented using the N-type MOSFET, the transistor 17's control terminal is its gate, the transistor 17's ground terminal is its source, and the transistor 17's output terminal is its drain. In addition, when the transistor 17 is implemented using the P-type MOSFET, the transistor 17's control terminal is its gate, the transistor 17's ground terminal is its drain, and the transistor 17's output terminal is its source.

Figure 4:
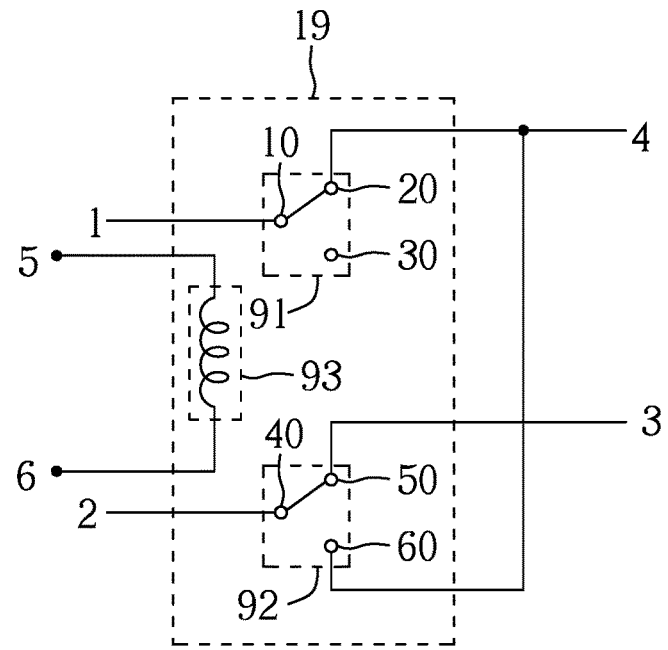
FIG. 4 illustrates a detailed diagram of the switch circuit shown in FIG. 1 according to one example of the present disclosure.

In one example, as shown in FIG. 4, the switch circuit 19 includes a switching winding 93, a first switch 91 and a second switch 92.

The switching winding 93 has a first terminal electrically coupled to the switch circuit 19's first control terminal. Moreover, the switching winding 93 has a second terminal that is electrically coupled to the switch circuit 19's second control terminal.

The first switch 91 has a first terminal 10 that is electrically coupled to the primary winding 11's first terminal 1 (via the node 10). In addition, the first switch 91 has a second terminal that is selectively and electrically coupled to one of the secondary winding 12's first terminal 4 (via the node 20) and second terminal 3 (via the node 30).

The second switch 92 has a first terminal that is electrically coupled to the activating capacitor 13's second terminal 6 (via the node 40). Besides, the second switch 92 has a second terminal that is selectively and electrically coupled to one of the secondary winding 12's first terminal 4 (via the node 60) and second terminal 3 (via the node 50).

In some examples, the controller 14's control signal is designed in response to the transistor 17's type. Operations of implementing the transistor 17 using a N-type MOSFET is explained herein in detail. However, operations of implementing the transistor 17 using other types of elements can be inducted for people who are skilled in the art.

Specifically, first, when the controller 14's control signal has a low voltage level, the transistor 17 is turned off, such that the switching winding 93's current flows from the terminal 5 to the terminal 6 (downwards in FIG. 4's view). Assume that the first switch 91 connects the node 10 with the node 20 by default (i.e., without being pushed or pulled by an electromagnetic force), and the second switch 92 connects the node 40 with the node 50 by default. In response to the switching winding 93's current flow that does not exert an electromagnetic force on the first switch 91, the first switch 91 exclusively and electrically connects the node 10 with the node 20 and therefore disconnects the node 10 from the node 30. Such that the first switch 91 exclusively and electrically connects the primary winding 11's first terminal 5 with the secondary winding 12's first terminal 4. Simultaneously, in response to the switching winding 93's current flow that does not exert an electromagnetic force on the second switch 92, the second switch 92 connects the node 40 with the node 50 and also disconnects the node 40 from the node 60. In this way, the second switch 92 exclusively and electrically connects the activating capacitor 13's second terminal 6 with the secondary winding 12's second terminal. Consequently, the secondary winding 12's drive current in response flows from its first terminal 4 to its second terminal 3, such that a fan that electromagnetically interacts with the secondary winding 12 rotates clockwise or counterclockwise (via design).

On the contrary, second, when the control signal has a high voltage level, the switching winding 93 electromagnetically exerts a force on both the first switch 91 and the second switch 92. In response, the first switch 91 connects the node 10 with the node 30 and correspondingly disconnects the node 10 from the node 20. Such that the first switch 91 electrically connects the primary winding 11's first terminal 5 with the secondary winding 12's second terminal 3. Simultaneously, in response, the second switch 92 connects the node 40 with the node 60 and correspondingly disconnects the node 40 from the node 60. Therefore, the second switch 92 electrically connects the activating capacitor 13's second terminal 6 with the secondary winding 12's first terminal 4. Consequently, the secondary winding 12's drive current in response flows from its second terminal 3 to its first terminal 4, such that the fan that electromagnetically interacts with the secondary winding 12 rotates clockwise or counterclockwise as opposed to the rotational direction for the low-voltage-level control voltage (via design).

With the aid of the above settings, the fan driving circuit 100 is capable of alternatively and electromagnetically rotates the fan clockwise and counterclockwise by alternating the control signal's voltage level between high and low. Such that the fan driving circuit 100 is capable driving the fan in bidirectional rotations that the conventional fan driving circuit fails to achieve.

In another example, the fan driving circuit 100 can be designed differently, for example, by merely switching the transistor 17 using a P-type MOSFET. Therefore, first, when the control signal has a high voltage level, the first switch 91 connects exclusively and electrically connects the primary winding 11's first terminal 5 with the secondary winding 4's first terminal by connecting the node 10 with the node 20 and disconnecting the node 10 from the node 30, and the second switch 92 exclusively and electrically connects the activating capacitor 13's second terminal 6 with the secondary winding's second terminal 3 by connecting the node 40 with the node 50 and disconnecting the node 40 from the node 60. Consequently, the secondary winding 12's drive current in response flows from its first terminal 4 to its second terminal 3.

Similarly, when the control signal has a low voltage level, the switching winding 93 electromagnetically exerts a force on both the first switch 91 and the second switch 92. In response, the first switch 91 electrically connects the primary winding 11's first terminal with the secondary winding 12's second terminal 3 by connecting the node 10 with the node 30 and disconnecting the node 10 from the node 20. Simultaneously, in response, the second switch 92 electrically connects the activating capacitor 13's second terminal 6 with the secondary winding 12's first terminal 4 by connecting the node 40 with the node 60 and disconnecting the node 40 from the node 50. Consequently, the secondary winding 12's drive current in response flows from its second terminal 3 to its first terminal 4.

In one example, the first switch 91 switches its second terminal to be electrically coupled to the secondary winding's second terminal 3 in response to an electromagnetic force from the switching winding 93, and the second switch 92 switches its second terminal to be electrically coupled to the secondary winding 12's first terminal 4 in response to the electromagnetic force from the switching winding.

In one example, the first switch 91 renders its second terminal to be electrically coupled to the secondary winding 12's second terminal 3 by default, and the second switch 92 renders its second terminal to be electrically coupled to the secondary winding 12's first terminal 4 by default.

In one example, the first switch 91 switches its second terminal to be electrically coupled to the secondary winding 12's first terminal 4 in response to an electromagnetic force from the switching winding 93, and the second switch 92 switches its second terminal to be electrically coupled to the secondary winding 12's second terminal 3 in response to the electromagnetic force from the switching winding.

Figure 2:
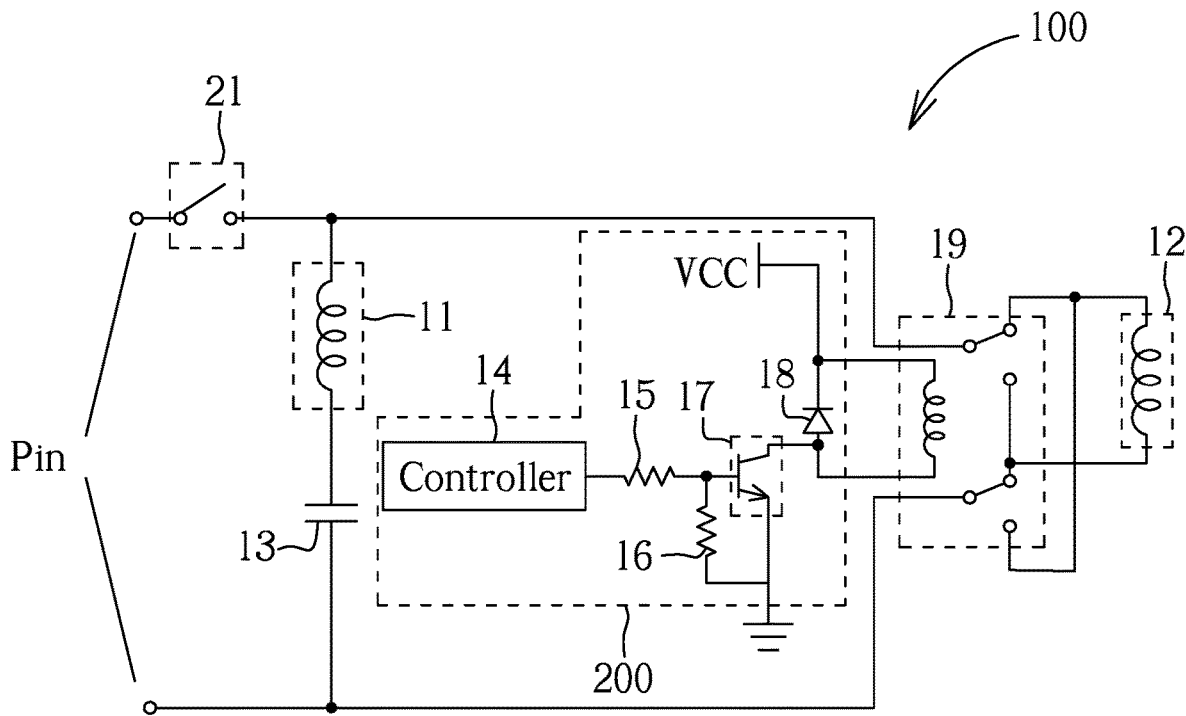
FIG. 2 and FIG. 3 illustrates the fan driving circuit shown in FIG. 1 that additionally include an auxiliary switch according to some examples of the present disclosure.
Figure 3:
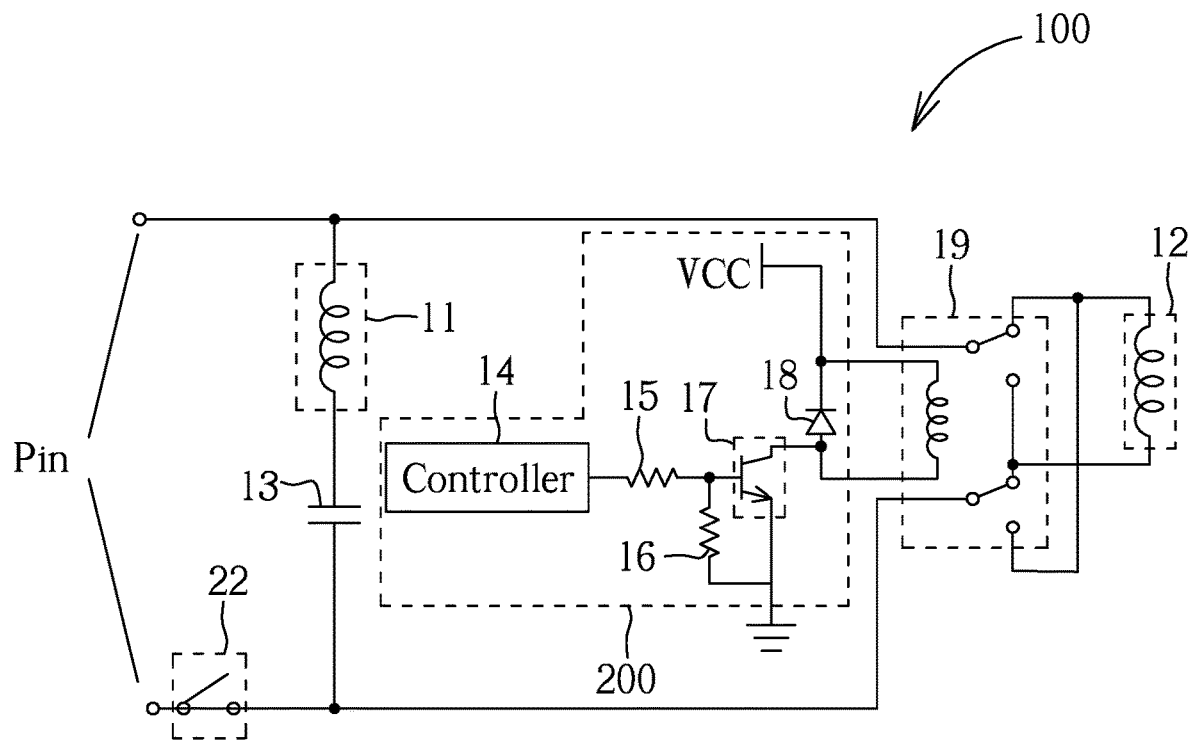

In one example, the fan driving circuit 100 additionally includes an auxiliary switch 21 that has a first terminal electrically coupled to the external power source's positive terminal at the node E1, as illustrated in FIG. 2. In addition, the auxiliary switch 21 has a second terminal that is electrically coupled to the primary winding 11's first terminal.

In another example, the fan driving circuit 100 includes an auxiliary switch 22 that has a first terminal electrically coupled to the external power source's negative terminal at the node E2. And the auxiliary switch 22 has a second terminal that is electrically coupled to the activating capacitor 13's second terminal.

In some examples, the controller 14 can be implemented using a central processing unit, a programmable logic controller, a system-on-chip (SoC) chip, or an embed processor.

In some examples, the primary winding 11 can be replaced by a secondary winding, and the secondary winding 12 can be replaced by a primary winding.

In some examples, the fan can further include a monitor for relaying and/or displaying its rotational direction (i.e., clockwise or counterclockwise) to the controller 14 for adequately and instant adjustments.

The invention claimed is:

1. A fan driving circuit, comprising:
   a primary winding, having a first terminal electrically coupled to a positive terminal of an external power source;
   an activating capacitor, having a first terminal electrically coupled to a second terminal of the primary winding, and having a second terminal electrically coupled to a negative terminal of the external power source;
   a control circuit, configured to generate a control signal;
   a switch circuit, having a first terminal electrically coupled to the first input terminal of the first winding, having a second input terminal electrically coupled to the second terminal of the activating capacitor, and having at least one control terminal electrically coupled to the control circuit for receiving the control signal; and
   a secondary winding, having a first terminal electrically coupled to a first output terminal of the switch circuit, and having a second terminal electrically coupled to a second output terminal of the switch circuit, wherein the secondary winding is configured to electromagnetically drive a fan according to a flowing direction of a driving current;
   wherein the switch circuit is configured to conduct a flowing direction a flowing direction of the driving current of the secondary winding based on a voltage level of the control signal, wherein the switch circuit is configured to conduct the driving current of the second winding to flow from the first terminal of the secondary winding to the second terminal of the secondary winding when the voltage level of the control signal is a low voltage level, wherein the switch circuit is configured to conduct the driving current of the secondary winding to flow from the second terminal of the secondary winding to the first terminal of the secondary winding when the voltage level of the control signal is high.

2. The fan driving circuit of claim 1, wherein the switch circuit is configured to conduct the driving current of the secondary winding to flow from the first terminal of the secondary winding to the second terminal of the secondary winding's second terminal when the voltage level of the control signal is a high voltage level.

3. The fan driving circuit of claim 1, wherein the switch circuit is configured to conduct the driving current of the secondary winding to flow from the second terminal of the secondary winding to the first terminal of the secondary winding when the voltage level of the control signal is a low voltage level.

4. The fan driving circuit of claim 1, wherein the control circuit comprises:
   a controller, configured to generate a preliminary signal;
   a transistor, having a control terminal electrically coupled to the controller for receiving the preliminary signal, and having a ground terminal electrically coupled to ground; and
   a diode, having a positive terminal electrically coupled to the output terminal of the transistor and the first control terminal of the switch circuit, and having a negative terminal electrically coupled to a direct current (DC) power source and the second control terminal of the switch circuit.

5. The fan driving circuit of claim 4, further comprising:
   a first resistor, having a first terminal electrically coupled to the controller, and having a second terminal electrically coupled to the control terminal of the transistor.

6. The fan driving circuit of claim 5, further comprising:
   a second resistor, having a first terminal electrically coupled to the control terminal of the transistor, and having a second terminal electrically coupled to the ground terminal of the transistor.

7. The fan driving circuit of claim 4, wherein the transistor is selected from a group consisting of a pnp-type bipolar junction transistor (BJT), a npn-type BJ, an N-type metal-oxide semiconductor FET (MOSFET), and a P-type MOSFET.

8. The fan driving circuit of claim 1, further comprising:
   an auxiliary switch, having a first terminal electrically coupled to the positive terminal of the external power source, and having a second terminal electrically coupled to the first terminal of the primary winding.

9. The fan driving circuit of claim 1, further comprising:
   an auxiliary switch, having a first terminal electrically coupled to the negative terminal of the external power source, and having a second terminal electrically coupled to the second terminal of the activating capacitor.

10. The fan driving circuit of claim 1, wherein the switch circuit comprises:
    a switching winding, having a first terminal electrically coupled to the first control terminal of the switch circuit, and having a second terminal electrically coupled to the second control terminal of the switch circuit;
    a first switch, having a first terminal electrically coupled to the first terminal of the primary winding, and having a second terminal selectively and electrically coupled to one of the first terminal of the secondary winding and second terminal; and
    a second switch, having a first terminal electrically coupled to the second terminal of the activating capacitor, and having a second terminal selectively and electrically coupled to one of the first terminal of the secondary winding and second terminal.

11. The fan driving circuit of claim 10, wherein when the control signal has a low voltage level, the first switch is further configured to exclusively and electrically connect the first terminal of the primary winding with the first terminal of the secondary winding, the second switch is further configured to exclusively and electrically connect the second terminal of the activating capacitor with the second terminal of the secondary winding, and the driving current of the secondary winding in response flows from its first terminal to its second terminal.

12. The fan driving circuit of claim 10, wherein when the control signal has a high voltage level, the switching winding is further configured to electromagnetically exert a force on both the first switch and the second switch, the first switch is in response further configured to electrically connect the first terminal of the primary winding with the second terminal of the secondary winding, the second switch is in response further configured to electrically connect the second terminal of the activating capacitor with the first terminal of the secondary winding, and the driving current of the secondary winding in response flows from its second terminal to its first terminal.

13. The fan driving circuit of claim 10, wherein when the control signal has a high voltage level, the first switch is further configured to exclusively and electrically connect the first terminal of the primary winding with the first terminal of the secondary winding, the second switch is further configured to exclusively and electrically connect the second terminal of the activating capacitor with the second terminal of the secondary winding, and the driving current of the secondary winding in response flows from its first terminal to its second terminal.

14. The fan driving circuit of claim 10, wherein when the control signal has a low voltage level, the switching winding is further configured to electromagnetically exert a force on both the first switch and the second switch, the first switch is in response further configured to electrically connect the first terminal of the primary winding with the second terminal of the secondary winding, the second switch is in response further configured to electrically connect the second terminal of the activating capacitor with the first terminal of the secondary winding, and the driving current of the secondary winding in response flows from its second terminal to its first terminal.

15. The fan driving circuit of claim 10, wherein the first switch is further configured to render its second terminal to be electrically coupled to the first terminal of the secondary winding by default, and the second switch is further configured to render its second terminal to be electrically coupled to the second terminal of the secondary winding by default.

16. The fan driving circuit of claim 15, wherein the first switch is further configured to switch its second terminal to be electrically coupled to the second terminal of the secondary winding in response to an electromagnetic force from the switching winding, and the second switch is further configured to switch its second terminal to be electrically coupled to the first terminal of the secondary winding in response to the electromagnetic force from the switching winding.

17. The fan driving circuit of claim 10, wherein the first switch is further configured to render its second terminal to be electrically coupled to the second terminal of the secondary winding by default, and the second switch is further configured to render its second terminal to be electrically coupled to the first terminal of the secondary winding by default.

18. The fan driving circuit of claim 17, wherein the first switch is further configured to switch its second terminal to be electrically coupled to the first terminal of the secondary winding in response to an electromagnetic force from the switching winding, and the second switch is further configured to switch its second terminal to be electrically coupled to the second terminal of the secondary winding in response to the electromagnetic force from the switching winding.

* * * * *